United States Patent

Sawada et al.

[11] Patent Number: 5,898,042
[45] Date of Patent: Apr. 27, 1999

[54] AQUEOUS FLUORORESIN COATING COMPOSITION AND PROCESS FOR PRODUCING SAME

[75] Inventors: Hiroyuki Sawada; Etsuzo Marumoto; Akihito Iida; Tatsuo Nishio; Hiroshi Inukai, all of Aichi, Japan

[73] Assignee: Toagosei Co., Ltd., Tokyo, Japan

[21] Appl. No.: 08/863,274

[22] Filed: May 27, 1997

Related U.S. Application Data

[63] Continuation of application No. 08/414,901, Mar. 30, 1995, abandoned.

[30] Foreign Application Priority Data

Apr. 1, 1994 [JP] Japan .................................. 6-087648
Dec. 26, 1994 [JP] Japan .................................. 6-337206

[51] Int. Cl.⁶ .................................................. C08L 27/12
[52] U.S. Cl. .................. 523/201; 525/276; 525/302; 525/902; 524/520; 524/524; 524/522; 524/567; 524/563; 524/545; 524/544
[58] Field of Search ............................ 523/201; 525/902, 525/276, 302; 524/524, 520, 522, 567, 563, 545, 544

[56] References Cited

U.S. PATENT DOCUMENTS

5,057,577 10/1991 Matsuo et al. ...................... 525/276

FOREIGN PATENT DOCUMENTS

A 0127407 12/1984 European Pat. Off. .
A 0221554 5/1987 European Pat. Off. .
A 0525660 2/1993 European Pat. Off. .

*Primary Examiner*—Mark L. Warzel
*Attorney, Agent, or Firm*—Sughrue, Mion, Zinn, Macpeak & Seas, PLLC

[57] ABSTRACT

An aqueous fluororesin coating composition and a process for producing the same, the coating composition comprising a core/shell fluorine-containing copolymer dispersed in an aqueous medium, the core/shell fluorine-containing copolymer comprising a core comprising a fluorine-containing copolymer comprising a repeating unit derived from a fluoroolefin monomer and a repeating unit derived from a vinyl carboxylate monomer and having a glass transition point Tg of 40° C. or more, and a shell comprising a fluorine-containing copolymer comprising a repeating unit derived from a fluoroolefin monomer and a repeating unit derived from a vinyl carboxylate monomer and having a glass transition point Tg of from −10 to 30° C., the weight ratio of the core to the shell being from 20/1 to 1/2.

10 Claims, No Drawings ically been studied taking into consideration that the residual amount of low molecular weight emulsifying agent in the emulsion is minimized. However, the aqueous dispersion of fluorine-containing copolymer according to the prior art still exhibits poor film-forming properties and water resistance as compared with the organic solvent type fluororesin coating composition and thus has limited application.

AQUEOUS FLUORORESIN COATING COMPOSITION AND PROCESS FOR PRODUCING SAME

This is a Continuation of application Ser. No. 08/414,901 filed Mar. 30, 1995 now abandoned.

FIELD OF THE INVENTION

The present invention relates to an aqueous fluororesin coating composition comprising a fluorine-containing copolymer as a main component dispersed in an aqueous medium and a process for producing the same. The aqueous fluororesin coating composition of the present invention is excellent in water resistance and stain resistance and thus can be used for various applications such as coating a building exterior.

BACKGROUND OF THE INVENTION

An organic solvent type coating composition has the problems of atmospheric pollution with organic solvents and harm to the human body. In recent years, there has been a growing demand for an aqueous coating composition to substitute for the organic solvent type coating composition.

A representative example of the aqueous coating composition includes an aqueous emulsion coating composition obtained by aqueous emulsion polymerization. As to a coating composition comprising a fluorine-containing copolymer as a main component, i.e., a fluorine-containing resin coating composition, many proposals have been made for an aqueous resin dispersion which can be used as an aqueous emulsion coating composition.

JP-A-2-225550 (The term "JP-A" as used herein means an "unexamined published Japanese patent application") proposes an aqueous resin dispersion obtained by emulsion polymerization of a fluoroolefin, a vinyl monomer having a polyoxyethylene group, and a hydroxyl group-containing monomer. JP-A-3-33148 proposes a process for the preparation of an aqueous dispersion of a fluorine-containing copolymer by emulsion polymerization of fluoroolefin monomers in the presence of a reactive emulsifying agent copolymerizable therewith.

In order to solve a problem common to aqueous coating compositions, i.e., poor water resistance of coating, the above proposals employ a process comprising an emulsion polymerization in the absence of an emulsifying agent by using the specific monomers or a process comprising copolymerizing an emulsifying agent upon polymerization.

As mentioned above, an aqueous fluororesin emulsion coating composition has heretofore been studied taking into consideration that the residual amount of low molecular weight emulsifying agent in the emulsion is minimized. However, the aqueous dispersion of fluorine-containing copolymer according to the prior art still exhibits poor film-forming properties and water resistance as compared with the organic solvent type fluororesin coating composition and thus has limited application.

SUMMARY OF THE INVENTION

An object of the present invention is to provide an aqueous fluororesin coating composition excellent in film-forming properties and water resistance.

Another object of the present invention is to provide a process for producing such an aqueous fluororesin coating composition.

These and other objects of the present invention will become more apparent from the following detailed description and examples.

The present inventors made extensive studies of an aqueous fluororesin coating composition even more excellent in various physical properties such as film-forming properties and water resistance. As a result, it was found that the use of a core/shell copolymer aqueous dispersion according to the present invention, which comprises a core having a glass transition point Tg of 40° C. or more and a shell having a glass transition point Tg of from −10 to 30° C., can provide an aqueous coating composition excellent in water resistance and hardness of a coated layer formed therefrom. Thus, the present invention was reached.

The present invention relates to an aqueous fluororesin coating composition comprising a core/shell fluorine-containing copolymer dispersed in an aqueous medium, the core/shell fluorine-containing copolymer comprising a core comprising a fluorine-containing copolymer comprising a repeating unit derived from a fluoroolefin monomer and a repeating unit derived from a vinyl carboxylate monomer and having a glass transition point Tg of 40° C. or more, and a shell comprising a fluorine-containing copolymer comprising a repeating unit derived from a fluoroolefin monomer and a repeating unit derived from a vinyl carboxylate monomer and having a glass transition point Tg of from −10 to 30° C., the weight ratio of the core to the shell being from 20/1 to 1/2.

The present invention also relates to a process for producing an aqueous fluororesin coating composition comprising a core/shell fluorine-containing copolymer, the weight ratio of core to shell being from 20/1 to 1/2, dispersed in an aqueous medium, the process comprising the steps of: (1) emulsion polymerizing a monomer mixture comprising a fluoroolefin monomer and a vinyl carboxylate, to form an aqueous dispersion of a core comprising a fluorine-containing copolymer particles having a glass transition point Tg of 40° C. or more; and (2) emulsion polymerizing a monomer mixture comprising a fluoroolefin monomer and a vinyl carboxylate, in the presence of the aqueous dispersion of a core, to form a shell comprising a fluorine-containing copolymer having a glass transition point Tg of from −10 to 30° C. on the fluorine-containing copolymer particles having a glass transition point Tg of 40° C. or more.

DETAILED DESCRIPTION OF THE INVENTION

As mentioned above, one of the characteristic features of the present invention is the use of a core/shell fluorine-containing copolymer. The core/shell polymer is a two-layer polymer synthesized by, for example, a two-stage emulsion polymerization process, as is known in the field of aqueous emulsion of alkyl acrylate copolymers.

The core and the shell of the core/shell fluorine-containing copolymer of the present invention each comprises a repeating unit derived from fluoroolefin monomer (fluoroolefin unit) and a repeating unit derived from vinyl carboxylate monomer (vinyl carboxylate unit) as main components. The contents of the fluoroolefin unit and the vinyl carboxylate unit in the core or the shell are each preferably such that the content of the fluoroolefin unit is from 30 to 60% by mole based on the total amount of the units constituting the copolymer forming the core or the shell, and the content of the vinyl carboxylate unit is from 30 to 60% by mole based on the total amount of the units constituting the copolymer.

Examples of the fluoroolefin monomer forming the core or the shell of the core/shell fluorine-containing copolymer of the present invention include chlorotrifluoroethylene, tetrafluoroethylene, vinylidene fluoride, vinyl fluoride, and hexafluoropropylene. Among these, chlorotrifluoroethylene is preferred due to its excellent copolymerization property with other monomers.

Examples of the vinyl carboxylate monomer forming the core or the shell of the core/shell fluorine-containing copolymer of the present invention include vinyl esters of straight-chain aliphatic carboxylic acid such as vinyl acetate, vinyl propionate, vinyl butyrate, vinyl caproate, vinyl caprate, vinyl laurate, vinyl myristate, vinyl palmitate, and vinyl stearate; vinyl esters of branched carboxylic acid such as vinyl isobutyrate, vinyl pivalate, vinyl 2-ethylhexanoate, vinyl ester of versatic acid which is a mixture of isomers of branched carboxylic acids having 9 carbon atoms (commercially available under the tradename "Veo Va 9" from Shell Chemical), and vinyl ester of versatic acid which is a mixture of isomers of branched carboxylic acids having 10 carbon atoms (commercially available under the tradename "Veo Va 10" from Shell Chemical); and aromatic vinyl carboxylates such as vinyl benzoate, vinyl p-methylbenzoate, vinyl p-ethylbenzoate, vinyl p-methoxybenzoate, and vinyl p-acetoxybenzoate.

The above vinyl carboxylate monomers are used in the present invention and appropriately selected depending on the desired Tg of the fluorine-containing copolymer. Preferred among these vinyl carboxylate monomers are vinyl esters of straight-chain aliphatic carboxylic acids and vinyl esters of branched aliphatic carboxylic acids.

Examples of monomers which can be preferably used to form both the core and the shell besides the foregoing fluoroolefin and vinyl carboxylate monomer include radical polymerizable monomers having a hydrophilic functional group such as a carboxyl group or a salt thereof, a sulfone group or a salt thereof, a hydroxyl group, and an amino group (hereinafter referred to as "hydrophilic monomers"). The hydrophilic monomers can be hydrophilic vinyl monomers.

Specific examples of the hydrophilic monomers having a carboxyl group include acrylic acid, methacrylic acid, crotonic acid, itaconic acid, maleic acid, fumaric acid, and vinylacetic acid. Specific examples of the hydrophilic monomer having a sulfone group include vinylsulfonic acid, styrenesulfonic acid, allylsulfonic acid, and 2-acrylamide-2-methylpropanesulfonic acid.

Examples of salts of the foregoing monomer include salts of the monomer with ammonia, an amine, and an alkaline metal.

Specific examples of the hydrophilic monomer having a hydroxyl group include hydroxyethyl (meth)acrylate, hydroxypropyl (meth)acrylate, hydroxybutyl (meth) acrylate, hydroxybutyl vinyl ether, hydroxyethyl allyl ether, hydroxyethyl crotonate, and N-methylol acrylamide. The term "(meth)acrylate" and the like words as used herein means "acyrlate or methacrylate" and the like. Specific examples of the hydrophilic monomer having an amino group include methacrylamide, acrylamide, diethylaminoethyl methacrylate, dimethylaminoethyl acrylate, and aminopropyl vinyl ether.

Preferred among these hydrophilic monomers are monomers having a carboxyl group or a salt thereof and monomers having a sulfone group or a salt thereof. Specific examples of these preferred hydrophilic monomers include acrylic acid, methacrylic acid, 2-acrylamide-2-methylpropanesulfonic acid, and salts thereof.

The content of the hydrophilic monomer unit in the core or shell moiety is preferably from 0.5 to 3% by mole based on the total amount of the units constituting the fluorine-containing copolymer forming the core or the shell. If the content of the hydrophilic monomer unit in the core or shell moiety falls below 0.5% by mole, the resulting aqueous dispersion tends to exhibit a reduced stability. If the content of the hydrophilic monomer unit in the core or the shell exceeds 3% by mole, a coated layer obtained from the resulting coating composition may have reduced water resistance.

The core/shell fluorine-containing copolymer of the present invention preferably comprises a crosslinking monomer having two or more radical polymerizable groups (hereinafter referred to as "crosslinking monomer") as a unit constituting the core. The content of the crosslinking monomer in the core is preferably from 0.5 to 5% by mole, more preferably from 1 to 4% by mole. If the content of the crosslinking monomer in the core falls below 0.5% by mole, the resulting coated layer tends to have a reduced hardness. If the content of the crosslinking monomer in the core exceeds 5% by mole, the resulting coating composition may exhibit deteriorated film-forming properties.

Examples of the crosslinking monomer include multi-functional vinyl ethers such as diethylene glycol divinyl ether, butanediol divinyl ether, hexanediol divinyl ether and trimethylolpropane trivinyl ether, and multi-functional (meth)acrylates such as butanediol di(meth)acrylate, hexanediol di(meth)acrylate, neopentyl glycol di(meth)acrylate, diethylene glycol di(meth)acrylate, tetraethylene glycol di(meth)acrylate, trimethylolpropane tri(meth)acrylate, and pentaerythritol tetra(meth)acrylate.

Preferred among these crosslinking monomers are an alkylene glycol diacrylate having an alkylene group containing 2 to 9 atoms such as butanediol diacrylate, neopentyl glycol diacrylate, and hexanediol acrylate.

In order to form the core or the shell, monomers other than the foregoing monomers may be used if desired. Examples of such monomers include halogenated olefins such as vinylidene chloride and vinyl chloride, olefins such as ethylene, propylene and isobutylene, vinyl ethers such as ethyl vinyl ether and butyl vinyl ether, (meth)acrylates such as methyl (meth)acrylate and cyclohexyl (meth)acrylate, allyl compounds such as allyl acetate, allyl butyrate and ethyl allyl ether, and styrene.

The content of the foregoing other monomers in both the core and the shell are each preferably from 0 to 30% by mole based on the amount of the fluorine-containing copolymer.

The core of the core/shell fluorine-containing copolymer of the present invention needs to comprise a fluorine-containing copolymer having a glass transition point Tg of not lower than 40° C., preferably from 50 to 100° C. If the glass transition point Tg of the fluorine-containing copolymer constituting the core is lower than 40° C., it exerts a reduced effect of improving the stain resistance of the core, and in the hot season, the resulting coated layer softens, making itself adhesive to soil.

The shell of the core/shell fluorine-containing copolymer of the present invention needs to comprise a fluorine-containing copolymer having a glass transition point Tg of from −10 to 30° C., preferably from −10 to 20° C. If the glass transition point Tg of the fluorine-containing copolymer constituting the shell moiety is higher than 30° C., it deteriorates the film-forming properties thereof. If the glass transition point Tg of the fluorine-containing copolymer constituting the shell is lower than −10° C., the resulting coated layer exhibits a reduced stain resistance. When the Tg of the copolymer of the core is relatively high, it is preferred that the Tg of the corresponding shell is relatively low.

In the present invention, the glass transition point Tg of the copolymer is determined by a thermal analysis commonly referred to as the DSC method.

In the present invention, the kinds and amount ratios of the monomers are appropriately selected so that the Tg of the copolymers constituting the core and the shell fall within the above ranges. The major factor of determining the Tg is the kind of the vinyl carboxylate monomer described above.

Representative specific examples of the relationship among the kind, proportion and Tg of monomer units constituting fluorine-containing copolymers will be listed below. CTFE represents chlorotrifluoroethylene. The proportion of the monomer units is represented in terms of percent by mole.

Fluorine-containing copolymers having a Tg of 40° C. or more suitable for the core
CTFE/Veo Va 9/acrylic acid=48.5/48.5/3; Tg=67° C.
CTFE/vinyl pyvalate/acrylic acid=48.5/48.5/3; Tg=69° C.
CTFE/vinyl benzoate/acrylic acid=48.5/48.5/3; Tg=64° C.
CTFE/vinyl cyclohexylcaboxylate/acrylic acid=48.5/48.5/3; Tg=54° C.
CTFE/Veo Va 9/vinyl caproate/acrylic acid=48.5/36.4/12.1/3; Tg=52° C.
CTFE/Veo Va 9/vinyl laurate/acrylic acid=48.5/42.5/6.0/3; Tg=52° C.
CTFE/Veo Va 9/hexamethylene glycol diacrylate/acrylic acid=50/42/5/3; Tg=75° C.
CTFE/Veo Va 9/vinyl caproate/hexamethylene glycol diacrylate/acrylic acid=50/29/14/4/3; Tg=60° C.
CTFE/Veo Va 9/vinyl laurate/hexamethylene glycol diacrylate/acrylic acid=50/38/5/4/3; Tg=55° C.

Fluorine-containing copolymers having a Tg of from −10 to 30° C. suitable for the shell
CTFE/vinyl caproate/acrylic acid=48.5/48.5/3; Tg=9° C.
CTFE/vinyl propionate/acrylic acid=48.5/48.5/3; Tg=22° C.
CTFE/vinyl caprylate/Veo Va 9/acrylic acid=48.5/24.2/24.3/3; Tg=11° C.
CTFE/vinyl isobutyrate/acrylic acid=48.5/48.5/3; Tg=16° C.
CTFE/vinyl caproate/Veo Va 9/acrylic acid=48.5/36.4/12.1/3; Tg=23° C.
CTFE/vinyl laurate/Veo Va 10/acrylic acid=50/16/31/3; Tg=−8° C.

The weight ratio of the polymer constituting the core to the polymer constituting the shell is preferably from 20/1 to 1/2, more preferably from 10/1 to 2/3, particularly preferably from 5/1 to 1/1. If the weight ratio of the core to the shell falls below 20/1, i.e., the weight ratio of the shell falls below the predetermined value, the film-forming properties during coating are deteriorated. If the weight ratio of the core to the shell exceeds 1/2, i.e., the weight ratio of the shell exceeds the predetermined value, the resulting coated layer exhibits a reduced stain resistance.

The molecular weight of the core and the shell are each preferably from 10,000 to 1,000,000, more preferably from 50,000 to 1,000,000 as calculated in terms of number-average molecular weight of polystyrene determined by gel permeation chromatography (hereinafter referred to as "GPC").

In a preferred process for the preparation of a core/shell fluorine-containing copolymer, a mixture of the foregoing monomers is subjected to a two-stage emulsion copolymerization, which comprises a 1st emulsion polymerization step and a 2nd emulsion polymerization step, by radical polymerization. One embodiment of the two-stage emulsion copolymerization will be further described hereinafter, but the present invention is not construed as being limited thereto.

In the 1st polymerization step, the monomers are allowed to undergo reaction in an aqueous medium in the presence of an emulsifying agent at a temperature of 20 to 100° C. under a pressure of 1 to 200 kg/cm$^2$ in a pressure autoclave for 3 to 40 hours. In this procedure, the monomers to be supplied may be batchwise charged entirely at the initial stage. Alternatively, the monomers may be continuously added to the reaction system, optionally in the form of pre-emulsion with an emulsifying agent, as the polymerization proceeds.

If necessary, a pH adjustor such as potassium carbonate, sodium hydrogencarbonate, ammonium hydrogencarbonate and disodium phosphate may be added to the polymerization system. A hydrophilic organic solvent may be used in combination with water as a part of polymerization medium.

When the polymerization procedure shifts from the 1st step to the 2nd step, the emulsion may be withdrawn from the system of the 1st polymerization step, and then added with monomers for the 2nd step which are then subjected to polymerization. Alternatively, after the completion of the reaction of the 1st step is confirmed by detecting the consumption of the monomers for the 1st step by gas chromatography, the monomers for the 2nd step may be charged and then polymerized. Conditions for the 2nd polymerization step may be basically the same as those of the 1st polymerization step.

When the polymerization reaction is completed, unreacted fluoroolefin monomers are normally left in the polymerization system. These unreacted fluoroolefin monomers are then purged. The unreacted fluoroolefin monomers thus purged may be recovered by an ordinary method, and then re-used for polymerization.

Preferred examples of the emulsifying agent used in the 1st emulsion polymerization step include combinations of an anionic emulsifying agent and a nonionic emulsifying agent. The anionic emulsifying agent may be used singly or in combination of two or more thereof. The nonionic emulsifying agent may be used singly or in combination of two or more thereof. The added amount of the anionic emulsifying agent is preferably from 0.5 to 5 parts by weight per 100 parts by weight of the total amount of monomers charged. The added amount of the nonionic emulsifying agent is preferably from 2 to 8 parts by weight per 100 parts by weight of the total amount of monomers charged.

Specific examples of the anionic emulsifying agent include higher alkyl-containing anionic emulsifying agents such as ammonium lauryl sulfate, sodium dodecylbenzenesulfonate, sodium alkylnaphthalenesulfonate, sodium dialkylsulfosuccinate, sodium poly(oxyethylene) alkyl ether sulfate, and sodium alkanesulfonate; and fluoroalkyl-containing anionic emulsifying agents such as perfluorooctanoic acid potassium salt, ammonium perfluorooctanoate, sodium perfluorooctane sulfonate, and ammonium perfluorooctane sulfonate.

Preferred among these anionic emulsifying agents are higher alkyl-containing anionic emulsifying agents, which can provide a small particle diameter of dispersed particles when dispersed in an aqueous medium and exhibit an excellent adhesion to a substrate.

Examples of the nonionic emulsifying agents include poly(oxyethylene) alkyl ether, poly(oxyethylene) alkyl phenyl ether, poly(oxyethylene) alkyl allyl ether, poly(oxyethylene) sorbitan ester aliphate, poly(oxyethylene) sorbitol ester aliphate, ester glyceroaliphate, and poly(oxyethylene) ester aliphate. Further, reactive emulsifying agents such a Aqualon RN Series (available from Dai-ichi Kogyo Seiyaku Co., Ltd.) may be used.

Preferred among these nonionic emulsifying agents are poly(oxyethylene) alkyl ether and poly(oxyethylene) alkyl phenyl ether, which can provide a small particle diameter of dispersed particles when dispersed in an aqueous medium.

Specific examples of a radical polymerization initiator used in the 1st and 2nd polymerization steps include organic peroxides such as diisopropyl peroxydicarbonate, tertiary butyl peroxypivalate, benzoyl peroxide, lauroyl peroxide, and succinic acid peroxide; azo compounds such as azobis (isobutyronitrile), azobis(isovaleronitrile), and azobisamidinopropane hydrochloride; and inorganic peroxides such as ammonium persulfate and potassium persulfate.

Further, redox system may be used. In this case, reducing agents such as sodium hydrogensulfite, sodium sulfite, Rongalite, and ascorbic acid may be used in combination with the foregoing peroxides.

When the core/shell fluorine-containing copolymer of the present invention is used as an aqueous coating composition, a film-forming aid such as butylcellosolve acetate is preferably added thereto. A pigment such as titanium oxide, iron oxide, phthalocyanine blue, benzidine yellow, and quinacridone; metal powder such as stainless steel powder, aluminum powder, and bronze powder; and other additives such as a pigment dispersant, an ultraviolet absorbent, a surface adjustor, a thickening agent, an anti-fungus agent, and a corrosion inhibitor may further be added.

The coating composition thus obtained can be applied to a substrate such as a stainless steel plate, an aluminum plate, concrete, mortar, plastics, and wood by means of a spray, brush, roll, bar coater or the like.

The present invention will be further described in the following examples and comparative examples, but the present invention should not be construed as being limited thereto. All parts, percents and the like are by weight unless otherwise indicated.

REFERENCE EXAMPLE 1

A 1st polymerization step was effected to obtain a core. In a 2-l autoclave equipped with an agitator were charged 534 g of pure water, 7.7 g of ammonium perfluorooctanoate as an anionic emulsifying agent, 17.3 g of Emulgen 910 (poly(oxyethylene) nonyl phenyl ether, available from Kao Corp.) as a nonionic emulsifying agent, 17.3 g of Emulgen 930 (poly(oxyethylene) nonyl phenyl ether, available from Kao Corp.) as another nonionic emulsifying agent, 319 g of vinyl versate (Veo Va 9; branched carboxylic vinyl ester having 9 carbon atoms available from Shell Chemical) (hereinafter referred to as "V-9") as a monomer, 7.4 g of acrylic acid (hereinafter referred to as "AA") as a monomer, and 12.6 g of ammonium hydrogencarbonate as a pH adjustor. Degassing and replacement by nitrogen were repeated three times. Deaeration was then effected. In the autoclave were then charged 405 g of chlorotrifluoroethylene (hereinafter referred to as "CTFE"). The reaction system was heated to a temperature of 40° C. where it was then stirred thoroughly for 1 hour. An aqueous solution of a polymerization initiator obtained by dissolving 3.4 g of ammonium persulfate in 20 g of water and an aqueous solution of a reducing agent obtained by dissolving 0.64 g of sodium hydrogensulfite in 10 g of water were pressed into the reaction system to initiate polymerization. Thereafter, 11.7 g of an aqueous solution of an initiator having the same concentration as above and 5.32 g of an aqueous solution of a reducing agent having the same concentration as above were added to the reaction system every 3 hours. Thus, polymerization was effected for 8 hours.

Unreacted CTFE was then purged. Replacement by nitrogen and evacuation were then effected until the pressure in the autoclave reached −500 mmHg. The autoclave was then opened to recover an aqueous dispersion of a fluorine-containing copolymer having a solid content of 49%.

Coagulum was not found in the aqueous dispersion of a fluorine-containing copolymer thus obtained. The percent polymerization conversion of V-9 and AA were each found not less than 99% as determined by gas chromatography. The dispersion was measured for particle diameter. As a result, the particle diameter distribution was found monodisperse, and the average particle diameter was 0.10 μm.

A part of the dispersion thus obtained was poured into methanol, washed, and then dried to obtain a copolymer as a sample to be analyzed. The copolymer exhibited a number-average molecular weight of 120,000 as determined by GPC with polystyrene standard and a glass transition point (hereinafter referred to as "Tg") of 68° C. Another analysis of the copolymer showed that it had a fluorine content of 19.0%. $^1$H-NMR and $^{13}$C-NMR of the copolymer showed that the percent composition of the copolymer (CTFE/V-9/AA) was 48.6/48.5/2.9 (% by mole).

A 2nd polymerization step was then effected. In a 1-l autoclave were charged 640 g of the aqueous dispersion prepared in the 1st step, 15 g of vinyl caproate (hereinafter referred to as "VCp") as a monomer and 0.15 g of AA as a monomer. Degassing and replacement by nitrogen were repeated three times. Deaeration was then effected. 25 g of CTFE was then charged in the autoclave. The reaction system was heated to a temperature of 40° C. where it was then stirred thoroughly for 1 hour. An aqueous solution of a polymerization initiator obtained by dissolving 1.0 g of ammonium persulfate in 10 g of water and an aqueous solution of a reducing agent obtained by dissolving 0.38 g of sodium hydrogensulfite in 5 g of water were then pressed into the reaction system to initiate polymerization. Thereafter, an aqueous solution of a polymerization initiator obtained by dissolving 0.5 g of ammonium persulfate in 5 g of water and an aqueous solution of a reducing agent obtained by dissolving 0.07 g of sodium hydrogensulfite in 5 g of water were then added to the reaction system every 3 hours. Thus, polymerization was effected for 8 hours.

Unreacted CTFE was then purged. Replacement by nitrogen and evacuation were then effected until the inner pressure in the autoclave reached −500 mmHg in the same manner as in the 1st stage polymerization procedure. The autoclave was then opened to recover 683 g of an aqueous dispersion of a fluorine-containing copolymer having a solid content of 50%.

Coagulum was not found in the aqueous dispersion of a fluorine-containing copolymer thus obtained. The percent polymerization conversion of VCp and AA were each not less than 99% as determined by gas chromatography. The dispersion was measured for particle diameter. As a result, the particle diameter distribution was found monodisperse, and the average particle diameter was 0.10 μm.

The particles of the core/shell fluorine-containing copolymer thus obtained was observed under transmission electron microscope. As a result, it was found that the particulate core/shell fluorine-containing copolymer has a monodisperse particle diameter distribution and hence a uniform particle diameter as in the case of the fluorine-containing copolymer constituting the core.

The core/shell fluorine-containing copolymer thus obtained exhibited a number-average molecular weight of 120,000 as determined by GPC with polystyrene standard and showed two Tg peaks at 68° C. and 11° C., with the latter being small.

Another analysis of the core/shell fluorine-containing copolymer showed that it had a fluorine content of 19.0%. $^1$H-NMR and $^{13}$C-NMR of the copolymer showed that the percent composition of monomer units constituting the copolymer (CTFE/VCp/V-9/AA) were 48.8/4.5/44.0/2.7 (% by mole).

The results of analysis of the amount, the solid content, and the copolymer composition of the aqueous dispersions obtained in the 1st and 2nd polymerization steps showed that the core/shell ratio was 10/1 by weight, and the percent composition the copolymer (CTFE/VCp/AA) was 50.8/48.2/1.0 (by mole).

The aqueous dispersion of the core/shell fluorine-containing copolymer thus obtained was then evaluated for stability in the following manner. The aqueous dispersions of the following Reference Examples were evaluated in the same manner.

Mechanical stability:

100 g of the aqueous dispersion was stirred at 5,000 rpm by means of a homodisper for 5 minutes, and then allowed to stand for 1 day to determine coagulation.

Chemical stability:

10 g of a 10% aqueous solution of calcium chloride was added to 10 g of the aqueous dispersion. The dispersion was then allowed to stand for 1 day to determine coagulation.

Freeze stability:

The aqueous dispersion was allowed to stand in a −5° C. constant temperature chamber for 1 day to determine coagulation.

High temperature stability:

The aqueous dispersion was allowed to stand at a temperature of 50° C. The number of days required until coagulation begins was determined.

The results are set forth in Table 1. As shown in Table 1, the aqueous dispersion is excellent in all these properties.

REFERENCE EXAMPLE 2

Polymerization was effected in the same manner as in Reference Example 1 except that 530 g of the same aqueous dispersion of a core-forming fluorine-containing copolymer as obtained in Reference Example 1 was used, 35 g of water was added, and as the monomers constituting the shell, 91 g of CTFE, 56 g of VCp and 0.6 g of AA were used. Thus, 708 g of an aqueous dispersion of a core/shell fluorine-containing copolymer having a solid content of 51% was obtained. No coagulation were found in the aqueous dispersion of a core/shell fluorine-containing copolymer. The percent polymerization conversion of VCp and AA were each not less than 99% as determined by gas chromatography. The dispersion was measured for particle diameter. As a result, it was found that the particle diameter distribution is monodisperse, and average particle diameter was 0.11 μm.

The core/shell fluorine-containing copolymer thus obtained exhibited a number-average molecular weight of 130,000 and showed two Tg peaks at 68° C. and 11° C.

Another analysis showed that the copolymer had a fluorine content of 19.6%. The copolymer was then analyzed in the same manner as in Reference Example 1. The percent composition of the copolymer (CTFE/VCp/V-9/AA) was 48.8/15.5/33.4/2.3 (by mole). The results of analysis of the amount, the solid content and the copolymer composition of the aqueous dispersions obtained in the 1st and 2nd polymerization steps showed that the core/shell ratio was 2/1 by weight, and the percentage composition of the shell-forming fluorine-containing copolymer (CTFE/VCp/AA) was 50.3/48.7/1.0 (by mole).

The results of evaluation of stability of the aqueous dispersion of the core/shell fluorine-containing copolymer are set forth in Table 1.

REFERENCE EXAMPLE 3

Polymerization was effected in the same manner as in Reference Example 1 except that 680 g of the same aqueous dispersion of a core-forming fluorine-containing copolymer as obtained in Reference Example 1 was used, 200 g of water was added, and as the monomers constituting the shell, 230 g of CTFE, 122 g of VCp and 1.75 g of AA were used. Thus, 1,165 g of an aqueous dispersion of a core/shell fluorine-containing copolymer having a solid content of 48% was obtained. Coagulum was not found in the aqueous dispersion of a core/shell fluorine-containing copolymer. The percent polymerization conversion of VCp and AA were each not less than 99% as determined by gas chromatography. The dispersion was measured for particle diameter. As a result, it was found that the particle diameter distribution was monodisperse, and the average particle diameter was 0.13 μm.

The core/shell fluorine-containing copolymer thus obtained exhibited a number-average molecular weight of 120,000 and showed two Tg peaks at 68° C. and 11° C.

Another analysis showed that the copolymer had a fluorine content of 20.1%. The copolymer was then analyzed in the same manner as in Reference Example 1. The percent composition of the copolymer (CTFE/VCp/V-9/AA) was 49.3/22.2/26.3/2.1 (by mole). The results of analysis of the amount, the solid content, and the copolymer composition of the aqueous dispersions obtained in the 1st and 2nd polymerization steps showed that the core/shell ratio was 1/1 (by weight), and the percent composition of the shell-forming fluorine-containing copolymer (CTFE/VCp/AA) was 50.1/48.6/1.3 (by mole).

The results of evaluation of stability of the aqueous dispersion of the core/shell fluorine-containing copolymer are set forth in Table 1.

REFERENCE EXAMPLE 4

405 g of CTFE, 178 g of vinyl pivalate (hereinafter referred to as "VPv"), 24 g of vinyl propyonate (hereinafter referred to as "VPr") and 7.5 g of AA were subjected to polymerization as the 1st step in the same manner as in Reference Example 1 to obtain an aqueous dispersion of a fluorine-containing copolymer having a solid content of 43.3% and an average particle diameter of 0.08 μm. The copolymer thus obtained exhibited a number-average molecular weight of 100,000, Tg of 60° C. and a fluorine content of 20.4%. The percent composition of the copolymer (CTFE/VPv/VPr/AA) was 50.1/40.1/6.9/2.9 (by mole).

Polymerization for the 2nd step was effected in the same manner as in Reference Example 1 except that 640 g of the same aqueous dispersion of a core-forming fluorine-containing copolymer thus obtained was used, and as monomers for the 2nd step, 25.3 g of CTFE, 12.5 g of VPv, 2.8 g of VPr, and 1.5 g of AA were used. Thus, 1,050 g of an aqueous dispersion of a core/shell fluorine-containing copolymer having a solid content of 42.9% was obtained. Coagulum was not found in the aqueous dispersion of a core/shell fluorine-containing copolymer. The percent polymerization conversion of VPv, VPr and AA were each not less than 99% as determined by gas chromatography. The dispersion was measured for particle diameter. As a result, it was found that the particle diameter distribution was monodisperse, and the average particle diameter was 0.10 μm.

The core/shell fluorine-containing copolymer thus obtained exhibited a number-average molecular weight of 110,000 and showed two Tg peaks at 60° C. and 30° C.

Another analysis showed that the copolymer had a fluorine content of 23.7%. The copolymer was then analyzed in the same manner as in Reference Example 1. The percent composition of monomers constituting the copolymer (CTFE/VPv/VPr/AA) was 49.6/40.0/7.2/3.2 (by mole). The results of analysis of the amount, the solid content, and the copolymer composition of the aqueous dispersions obtained in the 1st and 2nd polymerization steps showed that the core/shell ratio is 10/1 (by weight), and the percent composition of the shell-forming fluorine-containing copolymer (CTFE/VPv/VPr/AA) was 42.1/38.6/11.0/8.3 (by mole).

The results of evaluation of stability of the aqueous dispersion of the core/shell fluorine-containing copolymer are set forth in Table 1.

TABLE 1

|  | Mechanical stability (ppm) | Chemical stability (ppm) | Freeze stability (ppm) | High temperature stability (day) |
| --- | --- | --- | --- | --- |
| Reference Example 1 | 0 | 0 | 0 | 30 |
| Reference Example 2 | 0 | 0 | 0 | 30 |
| Reference Example 3 | 0 | 0 | 0 | 30 |
| Reference Example 4 | 0 | 0 | 0 | 30 |

EXAMPLES 1 TO 4

To 100 parts of each of the aqueous dispersions of a core/shell fluorine-containing copolymer obtained in Reference Examples 1 to 4 was added butyl cellosolve acetate as a film-forming aid in an amount set forth in Table 2 to prepare aqueous coating compositions. The coating compositions thus obtained were each coated to a 0.6-mm thick chromate-treated electrolytically zinc-plated steel plate to a dry thickness of 30 µm by means of a bar coater, and then dried at ordinary temperature for 1 week.

The external appearance of the resulting coated layer was visually observed. The results are set forth in Table 2.

COMPARATIVE EXAMPLE 1

A 1st polymerization step was effected in the same manner as in Reference Example 1 except that as the monomers constituting the core-forming fluorine-containing copolymer there were used 290 g of CTFE, 176 g of VCp, and 5.3 g of AA were used. Thus, an aqueous dispersion of a fluorine-containing copolymer having a solid content of 49% (hereinafter referred to as "aqueous dispersion A") was obtained. Coagulum was not found in the aqueous dispersion of a fluorine-containing copolymer. The dispersion was measured for particle diameter. As a result, it was found that the particle diameter distribution was monodisperse, and the average particle diameter was 0.1 µm.

The fluorine-containing copolymer thus obtained exhibited a number-average molecular weight of 120,000 and showed Tg of 10° C.

Another analysis showed that the copolymer had a fluorine content of 19.8%. The copolymer was then analyzed in the same manner as in Reference Example 1. The percent composition of the copolymer (CTFE/VCp/AA) was 51/46/3 (by mole).

The aqueous dispersion A was blended with the same aqueous dispersion of a fluorine-containing copolymer as obtained in the 1st polymerization step in Reference Example 1 having a percent composition CTFE/V-9/AA of 48.6/48.5/2.9 (by mole) and Tg of 68° C. (hereinafter referred to as "aqueous dispersion B") to prepare a 10/1 (by weight) blend of the aqueous dispersion B and the aqueous dispersion A.

To the blend was then added butyl cellosolve acetate as a film-forming aid in an amount set forth in Table 2. The resulting coating composition was then applied to a substrate in the same manner as in Examples 1 to 4 to prepare a coated layer. The coated layer was then examined in the same manner as in Examples 1 to 4. The results are set forth in Table 2.

COMPARATIVE EXAMPLES 2 AND 3

Blends were prepared in the same manner as in Comparative Example 2 except that the ratio of the aqueous dispersion B to the aqueous dispersion A were varied as set forth in Table 2. A film-forming aid was then added to these blends in an amount set forth in Table 2, respectively. The resulting coating composition were each then applied to a substrate in the same manner as in Examples 1 to 4 to prepare coated layers. These coated layers were each examined in the same manner as in Examples 1 to 4. The results are set forth in Table 2.

TABLE 2

|  | Aqueous dispersion | Core/shell ratio by weight* | Amount of film-forming forming aid (part by weight) | Condition of coating** |
| --- | --- | --- | --- | --- |
| Example 1 | Reference Example 1 | 10/1 | 5 | A |
| Example 2 | Reference Example 2 | 2/1 | 3 | A |
| Example 3 | Reference Example 3 | 1/1 | 1 | A |
| Example 4 | Reference Example 4 | 10/1 | 7 | B |
| Comparative Example 1 | Comparative Example 1 | 10/1 | 8 | C |
| Comparative Example 2 | Comparative Example 2 | 2/1 | 5 | C |
| Comparative Example 3 | Comparative Example 3 | 1/1 | 1 | C |

Note:
*Core/shell ratio or ratio of aqueous dispersion B to aqueous dispersion A
**A: good, good film forming property
B: fair, partly whitening
C: poor, whitening and cracking occurred

EXAMPLES 5 TO 8 AND COMPARATIVE EXAMPLES 4 TO 6

The coated layer formed in Examples 1 to 4 and Comparative Examples 1 to 3 were examined for the following properties. The results are set forth in Table 3.

(1) Water resistance test

The water resistance of the coated layer was evaluated visually and by water absorption. For the visual evaluation, the coated layer was dipped in water at 25° C. for 12 hours. The evaluation by water absorption was conducted in accordance with ASTM. That is, the coated layer was dipped in water at 25° C. for 12 hours, and the percent weight increase of the coated layer was then calculated.

(2) Stain resistance test

The coated layer was stained with an artificial staining suspension according to JSTM J7602, i.e., artificial staining suspension having a concentration of 1 g/l comprising 5.0 parts of carbon black, 67.5 parts of yellow ochre (synthetic yellow ochre), 22.5 parts of calcined Kanto loam, and 5.0 parts of silica powder, and then dried at a temperature of 40° C. for 10 minutes. This procedure was repeated 10 times. The color difference ($\Delta E$) between before and after the test was determined.

(3) Weathering resistance test

The coated layer was continuously irradiated with fluorescent ultraviolet rays by means of QUV (fluorescent ultraviolet weathering test machine available from Q Panel Co., Ltd.). In each 8-hour cycle, the coated layer was sprayed with ion-exchanged water on the opposite side of the coated layer for 4 hours. After 500 hours of test, the coated layer was examined for percent retention of gloss at an angle of 60°.

COMPARATIVE EXAMPLE 7

A coated plate was prepared and examined in the same manner as in Example 7 except that an aqueous dispersion of an acrylic copolymer Boncoat 818 (available from Dainippon Ink & Chemicals, Inc.) was used instead of the aqueous dispersion of the fluorine-containing copolymer. The results are set forth in Table 3.

impossible to separate the shell copolymer from the core/shell copolymer obtained after the 2nd polymerization step to effect the elementary analysis of fluorine content. Therefore, the proportion of CTFE unit was determined by subjecting the core/shell copolymer to elementary analysis to determine the content of CTFE in the core/shell copolymer, and then subtracting the content of CTFE in the shell copolymer therefrom.

The aqueous fluororesin coating composition thus obtained was evaluated for properties required for coating compositions in the following manner.

To 100 parts of each of the aqueous dispersions of a fluorine-containing copolymer was added 5 parts of butyl cellosolve acetate as a film-forming aid. The coating compositions thus obtained were each applied to a 0.6-mm thick chromate-treated zinc-plated steel plate to a dry thickness of 30 $\mu$m, and then dried at normal temperature for 1 week. The coated layer thus obtained was then examined as follows.

(1) Water resistance test

The coated layer was dipped in a 50° C. hot water for 24 hours, and then visually observed for change in the external appearance.

(2) Stain resistance test

The coated layer was stained with an artificial staining agent having the following composition, dried at a temperature of 60° C. for 10 minutes, and then sprayed with 200 cc of a washing water. This procedure was repeated five times. The color difference ($\Delta E$) between before and after the test was determined.

TABLE 3

| | Tested coating | Water resistance | | | Weathering resistance (%) |
|---|---|---|---|---|---|
| | | Water absorption (%) | Condition of coating* | Stain resistance ($\Delta E$) | |
| Example 5 | Example 1 | 1.3 | B | 2.1 | 96 |
| Example 6 | Example 2 | 1.0 | B | 1.7 | 98 |
| Example 7 | Example 3 | 0.4 | A | 2.0 | 96 |
| Example 8 | Example 4 | 1.6 | B | 2.3 | 97 |
| Comparative Example 4 | Comparative Example 1 | 3.2 | C | — | — |
| Comparative Example 5 | Comparative Example 2 | 3.0 | C | 3.5 | — |
| Comparative Example 6 | Comparative Example 3 | 1.8 | C | 4.5 | — |
| Comparative Example 7 | Comparative Example 7 | 0.4 | A | 6.8 | 72 |

Note:
*A: no abnormality
B: Whitening
C: Swelling

In the following Examples 9 to 12, the proportions of the monomer units constituting the core and the shell were determined as follows:

(1) Monomer units constituting the core copolymer

The proportion of chlorotrifluoroethylene was calculated on the basis of the elementary analysis of fluorine content in the copolymer. The proportion of monomer units other than CTFE were calculated on the basis of percent polymerization of the various monomers based on their charged amounts obtained by determining the amount of unreacted monomers by gas chromatography.

(2) Monomer units constituting the shell copolymer

The proportion of monomer units other than CTFE were determined by the same calculation as used for the core copolymer.

The proportion of CTFE unit can be determined by the elementary analysis of fluorine content. However, it is

| Artificial staining agent | |
|---|---|
| | Parts |
| Leaf mold | 7.60 |
| Kaolin | 3.40 |
| Diatomaceous earth | 3.40 |
| Cement | 3.40 |
| Carbon black | 0.35 |
| Red iron oxide | 0.10 |
| Oil | 1.75 |
| Sea sand | 200 |

(3) Weathering resistance test

The weathering resistance was evaluated in the same manner as in Examples 5 to 8.

EXAMPLE 9

A 1st polymerization step was effected as follows:

In a 2-l autoclave equipped with an agitator were charged 350 g of pure water, 5.5 g of sodium dodecylbenzenesulfonate as an anionic emulsifying agent, 12.4 g of Emulgen 910 (poly(oxyethylene) nonyl phenyl ether, available from Kao Corp.) as a nonionic emulsifying agent, 12.4 g of Emulgen 930 (poly(oxyethylene) nonyl phenyl ether, available from Kao Corp.) as another nonionic emulsifying agent, 191 g of V-9, 28 g of hexamethylene glycol diacrylate (hereinafter referred to as "HMDA"), 5.3 g of AA as a monomer, and 8.0 g of ammonium hydrogencarbonate as a pH adjustor.

Degassing and replacement by nitrogen were repeated three times. Degassing was then effected. In the autoclave were then charged 289 g of CTFE. The reaction system was heated to a temperature of 40° C. where it was then stirred thoroughly for 1 hour. An aqueous solution of a polymerization initiator obtained by dissolving 2.7 g of ammonium persulfate in 30 g of water and an aqueous solution of a reducing agent obtained by dissolving 0.51 g of sodium hydrogensulfite in 20 g of water were pressed into the reaction system in 5.5 hours. Thus, polymerization was effected for 7.5 hours in all.

A part of the reaction solution was analyzed by gas chromatography to confirm that the percent reaction of monomers other than CTFE had reached almost 100%. Thereafter, a part of the aqueous dispersion was withdrawn for the measurement of solid content and elementary analysis of monomer units of the copolymer. As a result, the solid content was found to be 50% by weight, the elementary analysis of the copolymer showed a fluorine content of 19.2% by weight, and the copolymer showed Tg of 75° C.

The percent composition for CTFE/V-9/HMDA/AA of the copolymer calculated from the fluorine content and gas chromatography analysis of monomers other than CTFE was 50.3/41.8/4.9/3.0 (by mole).

A 2nd polymerization step was then effected. In the autoclave containing the aqueous resin dispersion obtained in the foregoing polymerization and CTFE which had been excessively charged and left unreacted were charged 71 g of VCp and 2.3 g of AA as monomers. The reaction system was heated to a temperature of 40° C. where it was then stirred for 1 hour. An aqueous solution of a polymerization initiator obtained by dissolving 1.3 g of ammonium persulfate in 30 g of water and an aqueous solution of a reducing agent obtained by dissolving 0.25 g of sodium hydrogensulfite in 20 g of water were then pressed into the reaction system in 4 hours. Thus, polymerization was effected for 5.5 hours in all. After the completion of polymerization, unreacted CTFE was purged. Replacement by nitrogen and evacuation were then effected until the inner pressure in the autoclave reached −500 mmHg. The autoclave was then opened to recover an aqueous dispersion of a core/shell fluorine-containing copolymer having a solid content of 49%.

Coagulum was not found in the aqueous dispersion of a fluorine-containing copolymer thus obtained. The average particle diameter of the aqueous dispersion was 0.18 μm. In order to determine the proportion of uncrosslinked shell copolymer and crosslinked core copolymer, the core/shell copolymer was divided into a moiety soluble in acetone and a moiety insoluble in acetone. As a result, it was found that the ratio of the core copolymer to the shell copolymer is 2.3/1 by weight.

The core/shell copolymer thus obtained was then subjected to elementary analysis to determine the fluorine content thereof. The result was 20.1%. The CTFE content in the core copolymer was subtracted from CTFE content calculated from the fluorine content to determine CTFE content in the shell copolymer. The content of other monomers were determined by calculating the content in the shell copolymer on the basis of their percent polymerization.

As a result, the percent monomer composition for CTFE/VCp/AA of the shell copolymer was 49.6/47.4/3.0 (by mole).

The core/shell copolymer was then measured for Tg. As a result, the core/shell copolymer showed two glass transition points at 75° C. and 10° C. as determined by DSC method.

An aqueous dispersion of the core/shell copolymer thus obtained was used to prepare a coating composition in the same manner as mentioned above. The resulting aqueous coating composition was then evaluated for physical properties of coated layer. The results are set forth in Table 4.

EXAMPLE 10

A monomer mixture of 435 g of CTFE, 112 g of VPv, 30 g of VPr, 27 g of nanomethylene diacrylate (hereinafter referred to as "NMDA") and 6.4 g of methacrylic acid (hereinafter referred to as "MA") was charged into an autoclave as monomers for the 1st step. The reaction system was then subjected to polymerization in the same manner as in Example 9 to obtain a core copolymer comprising CTFE, VPv, VPr, NMDA, and MA in a proportion of 47.8%, 33.8%, 11.6%, 3.8%, and 2.9% by mole.

Subsequently, as monomers for the 2nd polymerization step, 62 g of VPr and 3.1 g of MA were charged. A further polymerization was effected to obtain an aqueous dispersion of a core/shell copolymer by the 1st and 2nd polymerization steps (average particle diameter: 0.15 μm). The weight ratio of the core copolymer and the shell copolymer was 2.5/1.

The percent monomer composition for CTFE/VPr/MA of the shell copolymer was 48.8/48.3/2.9 (by mole).

The core/shell copolymer thus obtained was measured for Tg. As a result, the core/shell copolymer showed Tg of 67° C. and 20° C.

The physical properties of a coating composition comprising an aqueous dispersion of the core/shell copolymer are set forth in Table 4.

EXAMPLE 11

A monomer mixture of 434 g of CTFE, 131 g of V-9, 51 g of VCp, 23 g of HMDA and 5.3 g of AA was charged into an autoclave as monomers for the 1st polymerization step. The reaction system was then subjected to polymerization in the same manner as in Example 9 to obtain a core copolymer comprising CTFE, V-9, VCp, HMDA and AA in a proportion of 50%, 28.7%, 14.3%, 4.0% and 3.0% by mole.

Subsequently, as monomers for the 2nd polymerization step, 72 g of V-9, 44 g of vinyl laurate (hereinafter referred to as "VL"), and 2.7 g of AA were charged. A further polymerization was effected to obtain an aqueous dispersion of a core/shell copolymer by the 1st and 2nd polymerization steps (average particle diameter: 0.19 μm). The weight ratio of the core copolymer and the shell copolymer was 1.9/1.

The percentage monomer composition for CTFE/V-9/VL/AA of the shell copolymer was 50/31.3/15.7/3.0 (by mole).

The core/shell copolymer thus obtained was measured for Tg. As a result, the core/shell copolymer showed Tg of 60° C. and 10° C.

The physical properties of a coating composition comprising an aqueous dispersion of the core/shell copolymer are set forth in Table 4.

EXAMPLE 12

A monomer mixture of 434 g of CTFE, 131 g of V-9, 51 g of VCp, 23 g of HMDA and 5.3 g of AA was charged into an autoclave as monomers for the 1st polymerization step. The reaction system was then subjected to polymerization in the same manner as in Example 9 to obtain a core copolymer comprising CTFE, V-9, VCp, HMDA, and AA in a proportion of 50%, 28.7%, 14.3%, 4.0%, and 3.0% by mole.

Subsequently, as monomers for the 2nd polymerization step, 49 g of V-9, 80 g of VL and 2.7 g of AA were charged. A further polymerization was effected to obtain an aqueous dispersion of a core/shell copolymer by the 1st and 2nd polymerization steps (average particle diameter: 0.19 μm). The weight ratio of the core copolymer and the shell copolymer was 1.9/1.

The percentage monomer composition for CTFE/V-9/VL/AA of the shell copolymer was 48.5/20.8/27.8/2.9 (by mole).

The core/shell copolymer thus obtained was measured for Tg. As a result, the core/shell copolymer showed Tg of 60° C. and −8° C.

The physical properties of a coating composition comprising an aqueous dispersion of the core/shell copolymer are set forth in Table 4.

TABLE 4

|  | Example | | | |
| --- | --- | --- | --- | --- |
|  | 9 | 10 | 11 | 12 |
| Gloss retention (%) | 97 | 98 | 98 | 97 |
| Color difference (ΔE) | 2.2 | 2.3 | 2.2 | 2.5 |
| Water resistance | good | good | good | good |
| Pencil hardness | B | B | B | B |

The aqueous coating composition comprising the flourine-coating copolymer of the present invention exhibits excellent film-forming properties. Further, the resulting coated layer exhibits an excellent stain resistance and a high hardness. Thus, the aqueous coating composition of the present invention can be used as an external coating composition for buildings and other materials that are subjected to stain with automobile emission or like soil.

while the invention has been described in detail and with reference to specific embodiments thereof, it will be apparent to one skilled in the art that various changes and modifications can be made therein without departing from the spirit and scope thereof.

What is claimed is:

1. An aqueous fluororesin coating composition comprising a core/shell fluorine-containing copolymer dispersed in an aqueous medium;

said core/shell fluorine-containing copolymer comprising a core comprising a fluorine-containing copolymer consisting essentially of a repeating unit derived from a fluoroolefin monomer, a repeating unit derived from a vinyl carboxylate monomer, and a repeating unit derived from a hydrophilic vinyl monomer, the flourine-containing copolymer of the core having a glass transition point Tg of 40° C. or more and a shell comprising a fluorine-containing copolymer consisting essentially of a repeating unit derived from a fluoroolefin monomer, a repeating unit derived from a vinyl carboxylate monomer, and a repeating unit derived from a hydrophilic vinyl monomer, the flourine-containing copolymer of the shell having a glass transition point Tq of from −10 to 30° C., the weight ratio of said core to said shell being from 20/1 to 1/2.

2. An aqueous fluororesin coating composition as claimed in claim 1, wherein said core comprises a fluorine-containing copolymer having a glass transition point Tg of from 50 to 100° C.

3. An aqueous fluororesin coating composition as claimed in claim 1, wherein said fluorine-containing copolymer constituting said core consists essentially of from 30 to 60% by mole, based on the total amount of said core, of a repeating unit derived from the fluoroolefin monomer and from 30 to 60% by mole, based on the total amount of said core, of a repeating unit derived from the vinyl carboxylate monomer; and the repeating unit derived from the hydrophilic vinyl monomer, and said fluorine-containing copolymer constituting said shell consists essentially of from 30 to 60% by mole, based on the total amount of said shell, of a fluorine-containing copolymer comprising a repeating unit derived from the fluoroolefin monomer and from 30 to 60% by mole, based on the total amount of said shell, of a repeating unit derived from the vinyl carboxylate monomer; and the repeating unit derived from the hydrophilic vinyl monomer.

4. An aqueous fluororesin coating composition as claimed in claim 1, wherein said fluorine-containing copolymer constituting said core further includes a repeating unit derived from a crosslinking monomer having two or more radical polymerizable groups in its molecule.

5. An aqueous fluororesin coating composition as claimed in claim 4, wherein said crosslinking monomer is an alkyleneglycol diacrylate having an alkylene group containing from 2 to 9 carbon atoms.

6. An aqueous fluororesin coating composition as claimed in claim 4, wherein the amount of said crosslinking monomer is from 0.5 to 5% by mole based on the total amount of said core.

7. An aqueous fluororesin coating composition as claimed in claim 1, wherein the amount of said hydrophilic vinyl monomer is from 0.5 to 3% by mole based on the total amount of said core or said shell.

8. An aqueous fluororesin coating composition as claimed in claim 1, wherein the weight ratio of said core to said shell is from 10/1 to 2/3.

9. A process for producing an aqueous fluororesin coating composition comprising a core/shell fluorine-containing copolymer, the weight ratio of core to shell being from 20/1 to 1/2, dispersed in an aqueous medium, said process comprising the steps of:

(1) emulsion polymerizing a monomer mixture consisting essentially of a fluoroolefin monomers a vinyl carboxylate and a repeating unit derived from a hydrophilic vinyl monomer, to form an aqueous dispersion of a core consisting essentially of a fluorine-containing copolymer particles having a glass transition point Tg of 40° C. or more; and (2) emulsion polymerizing a monomer mixture consisting essentially of a fluoroolefin monomers a vinyl carboxylate and a repeating unit derived from a hydrophilic vinyl monomer, in the presence of said aqueous dispersion of a core, to form a shell consisting essentially of a fluorine-containing copolymer having a glass transition point Tg of from −10 to 30° C. on said fluorine-containing copolymer particles having a glass transition point Tg of 40° C. or more.

10. A process for producing an aqueous fluororesin coating composition as claimed in claim 9, wherein said fluorine-containing copolymer constituting said core consists essentially of from 30 to 60% by mole, based on the total amount of said core, of a repeating unit derived from the fluoroolefin monomer and from 30 to 60% by mole, based on the total amount of said core, of a repeating unit derived from the vinyl carboxylate monomer; and the repeating unit derived from the hydrophilic vinyl monomer, and said fluorine-containing copolymer constituting said shell consists essentially of from 30 to 60% by mole, based on the total amount of said shell, of a fluorine-containing copolymer consisting essentially of a repeating unit derived from the fluoroolefin monomer and from 30 to 60% by mole, based on the total amount of said shell, of a repeating unit derived from the vinyl carboxylate monomer; and the repeating unit derived from the hydrophilic vinyl monomer.

* * * * *